United States Patent [19]
Vilhelmsson

[11] Patent Number: 5,422,725
[45] Date of Patent: Jun. 6, 1995

[54] CANTILEVER SYSTEM FOR HOLDING AND POSITIONING COMPONENTS

[75] Inventor: Kennet J. Vilhelmsson, Partille, Sweden

[73] Assignee: Radians Innova AB, Gothenburg, Sweden

[21] Appl. No.: 27,169

[22] PCT Filed: Sep. 17, 1991

[86] PCT No.: PCT/SE91/00623
§ 371 Date: May 17, 1993
§ 102(e) Date: May 17, 1993

[87] PCT Pub. No.: WO92/05461
PCT Pub. Date: Apr. 2, 1992

[30] Foreign Application Priority Data

Sep. 17, 1990 [SE] Sweden .................. 9002965

[51] Int. Cl.$^6$ .................. G01B 11/00; G02B 6/36
[52] U.S. Cl. .................. 356/399; 385/52
[58] Field of Search .................. 356/153, 399; 385/52, 385/90, 91; 359/811, 813, 814, 822, 872, 873, 874; 372/107

[56] References Cited

U.S. PATENT DOCUMENTS 3,764,934 10/1973 Schamberger .................. 372/107
4,884,015 11/1989 Sugimoto et al. .................. 385/90
4,930,858 6/1990 Veenendaal .

FOREIGN PATENT DOCUMENTS 3732566 4/1988 Germany .................. 385/52
3827960 2/1990 Germany .................. 385/52

Primary Examiner—F. L. Evans
Attorney, Agent, or Firm—Klarquist Sparkman Campbell Leigh & Whinston

[57] ABSTRACT

The present invention relates to a device for lash free positioning of especially components used in optical and optoelectronical equipments relatively to a fixed reference unit using at least two interconnected elastic blocks each consisting of two base elements placed at a distance from each other and interconnected by elastic elements, constituting a cantilevered system as related to one of the base elements. To the system a holder is attached, on which the components to be positioned are fixed, that each elastic block is essentially rigid along a main axis (z) of the elastically undeformed cantilevered system, and is elastic in directions perpendicular to the axis, that the device has mechanisms for adjustment which apply adjustable forces between the basic element, or between some other to the latter fixedly joined element, and the cantilevered system or an arm fixed to this system, which latter may be the holder, acting in chosen directions, which translate or turn the component holder, when the elastic elements are elastically deformed.

13 Claims, 4 Drawing Sheets

CANTILEVER SYSTEM FOR HOLDING AND POSITIONING COMPONENTS

The present invention relates to a device for lash free positioning of especially components used in optical and optoelectronical equipments relatively to a fixed reference unit using at least two interconnected elastic blocks, each consisting of two base elements placed at a distance from each other and interconnected by elastic elements constituting a cantilevered system as related to one of the base elements.

BACKGROUND OF THE INVENTION

A modern development of optics is optronics (also termed optoelectronics). Areas of applications of optronics are e.g. optical fiber communications, gauges for measurements of dimensions and for indications of positions, sensors for special analysis and for analysis of scattering etc. The optical equipment is comprised by optical, mechanical and electronic building elements.

It is desirable in optronic equipment to integrate the building elements into a stable and miniaturized unit. Especially in a development phase it is also preferred to have some of the elements easily replaceable. A requirement set for many of the elements is also that they should be adjustable as regards position and attitude, so that the optical beam path strived for in the equipment can be attained. The beam cross section, in e.g. semiconductor lasers and single mode fibres that are used in optical communications, have a diameter of the order of magnitude of micrometers. It is therefore in aligning such equipment necessary to be able to make adjustments with an accuracy and precision corresponding to a micrometer or submicrometer change in position. It is also important that components, which have been positioned, keep their position and attitude for a very long period of time, also in a mechanically adverse surrounding environment. It is common in a development phase that the optronical components are mounted on mechanical units obtained from a standardized building set of optical benches, sleds, holders, translational and rotational devices etc. It is unavoidable that such construction becomes bulky unstable and sensitive to vibrations. This is true even if the individual elements themselves are capable of e.g. a translation with a sufficient precision. Several designs of spring blocks of the type referred to are known, e.g. through an article in Journal of Scientific Instruments, Vol. 33, January 1956 titled "Some parasitic deflexions in parallell spring movements". This type of device has, however, only found a limited use.

The U.S. Pat. No. 4,930,858 refers to a positioning apparatus for optical fibres, which is intended to make two fibre ends, or one fibre end and a laser beam, parallel in relation to each other. The apparatus consists of 3 circular plates, provided at a distance from each other and connected to each other by "shoulders" integrated in the plates, that is by segment formed portions of material. In the plates central apertures are provided for mounting of e.g. a fibre end in the movable upper plate and to permit free optical beam path to e.g. a laser, which is mounted in the fixed part of the apparatus.

By means of screws, which apply forces on the plates crosswise these, that is in the axis direction of the apparatus, the upper movable plate can be forced to form a first angle with the central plate, and this, in the same way with further screws, which act in the axis direction, can be forced to form a second angle with the bottom plate. In these turning movements, which occur about the chords of the segments, both the movable plates will be tilted and therewith the part—e.g. the fibre end—which is to be adjusted.

This apparatus known can be used when two directions shall be brought to correspond and where it is of no importance if the movable component, which is to be adjusted, in addition to the desired turning also performs an inevitable, that is coupled, translation in the axis direction. This apparatus known thus cannot be used for positioning of an optical component, where it is required that the movable component during the adjustment maintains its angular position relatively to the fixed component. In other words, one should be able to translate the movable component to a desired position without it being turned. Further it shall be possible in certain applications that the movable component be given a desired turn, which is accomplished by giving the point/points of action for the forces generated by the adjustment mechanism a certain location along the main axis of the system, that is the Z-axis.

The object of the invention and its most important characteristics.

The object of the invention is to produce a positioning device that allows for translations in serveral directions, a combination of translation and rotation or solely a rotation. Further all adjustments shall be made free of lash and the dimensions of the components,that are used, shall be sufficiently small, to allow for a compact integration with electronic or optoelectronic instruments. These objects have been solved thereby, that a holder that is attached to the system, on which the components to be positioned are fixed, that each elastic block is essentially rigid along a main axis (z) of the elastically undeformed cantilevered system, and is elastic in directions perpendicular to the axis, that the device has mechanisms for adjustment which apply adjustable forces between the basic element, or between some other to the latter fixedly joined element, and the cantilevered system or an arm fixed to this system, which latter may be the holder, acting in chosen directions, which translate or turn the component holder, when the elastic elements are elastically deformed.

DESCRIPTION OF DRAWINGS

The invention will be further described below with reference to the attached drawings, which show some examples of embodiments.

DESCRIPTION OF EXAMPLES OF EMBODIMENTS

Figure 1:
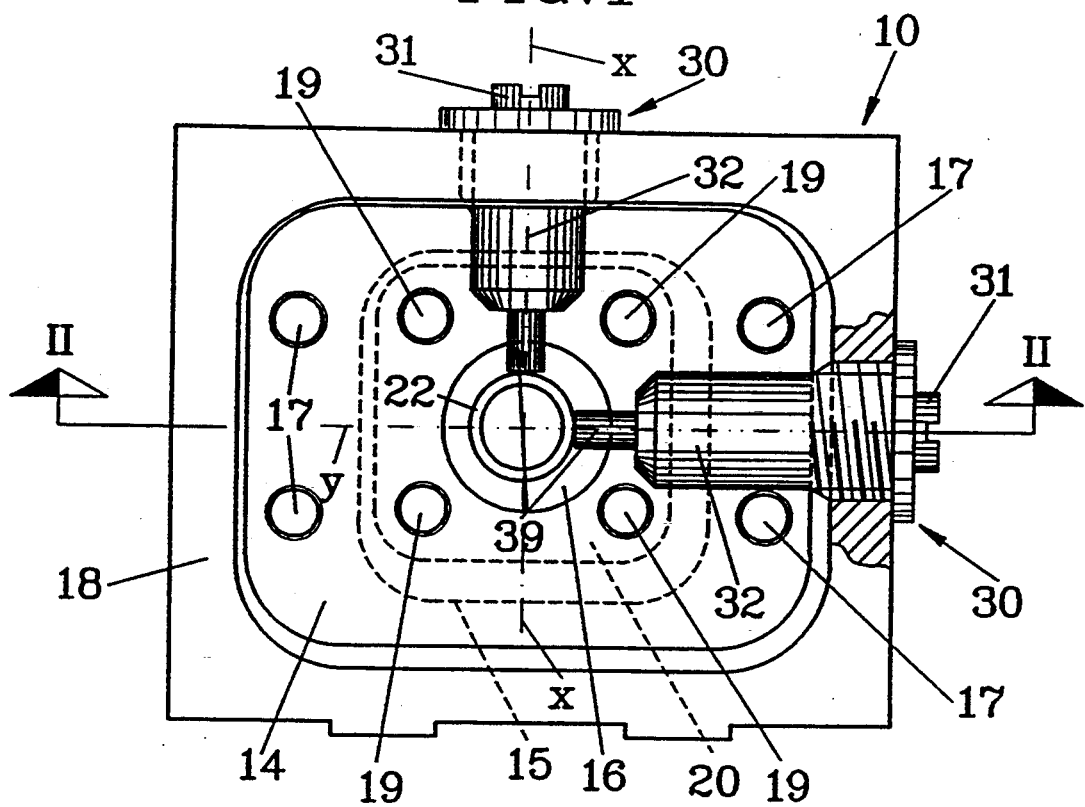
FIG. 1. shows an end view of the positioning device according to the invention.
Figure 2:
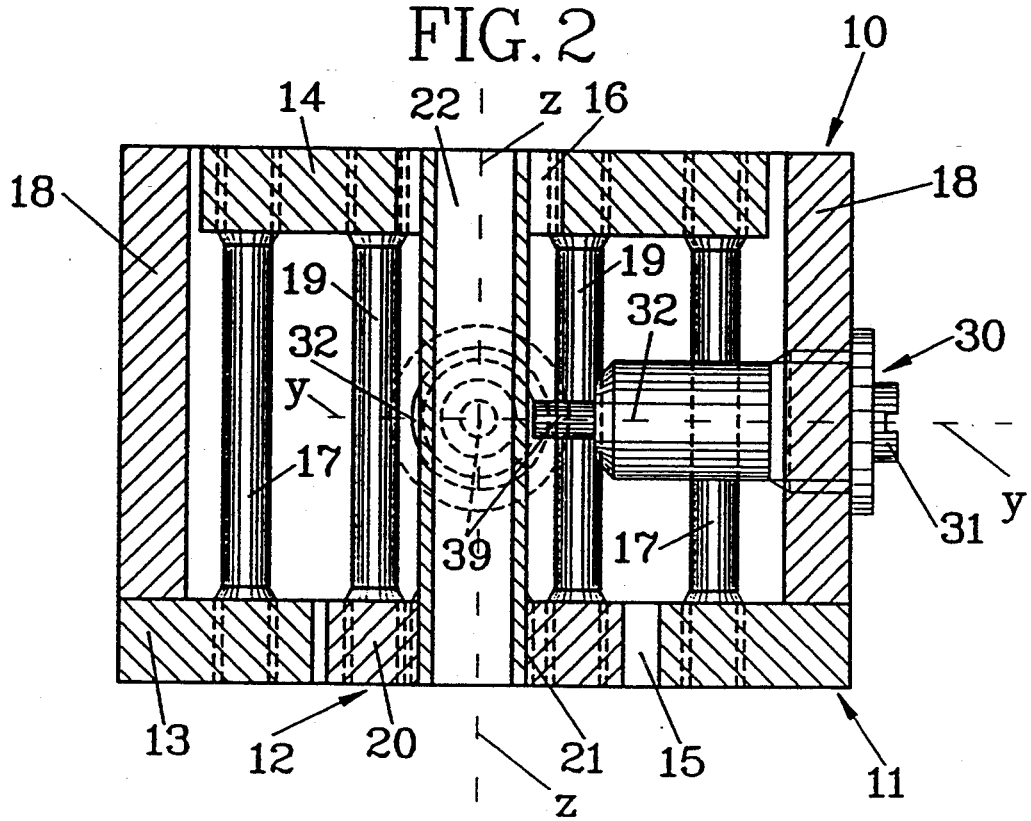
FIG. 2. shows a section along the line II—II of FIG. 1.
Figure 3:
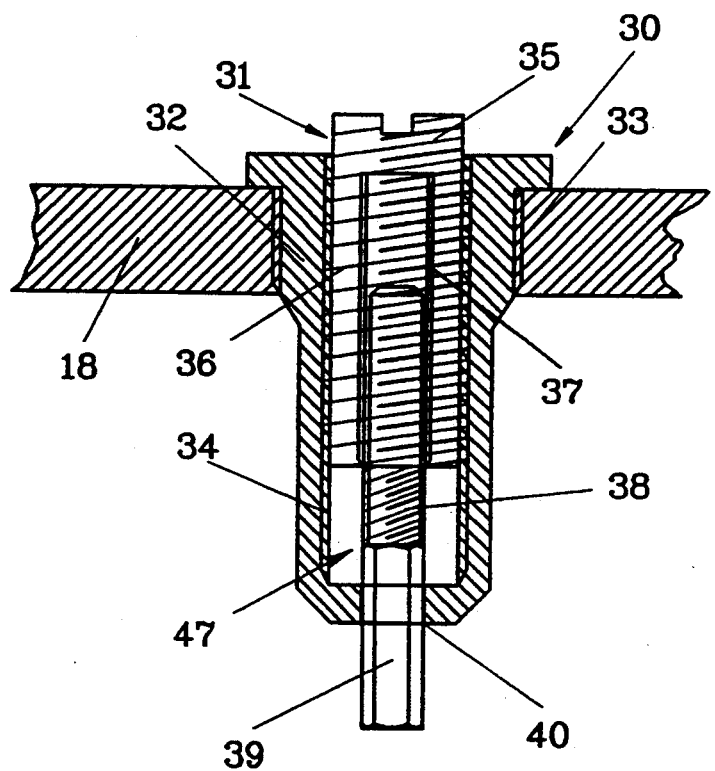
FIG. 3. shows on a larger scale a differential screw which in accordance with FIGS. 1 and 2 is part of the positioning device.

The positioning device according to the invention shown in FIGS. 1 and 2, which is indicated by the number 10 in the drawings, consists of two elastic blocks 11 and 12, which are joined to each other and with the one system 11 consisting of two base elements 13 and 14 in the shape of plates which have central apertures. By positioning, in this context, is understood both moving and/or turning. The plates mentioned are kept at a distance from each other and joined by a number of, e.g. four, elastic elements 17, which in the embodiment shown consist of rods made of beryllium copper, stainless steel or the like. One of them, the first base element 13, is fixedly united with a housing 18, which has the shape of a rectangular frame, which surrounds both of the spring blocks, while the other one, the base element 14, is movable.

Figure 5:
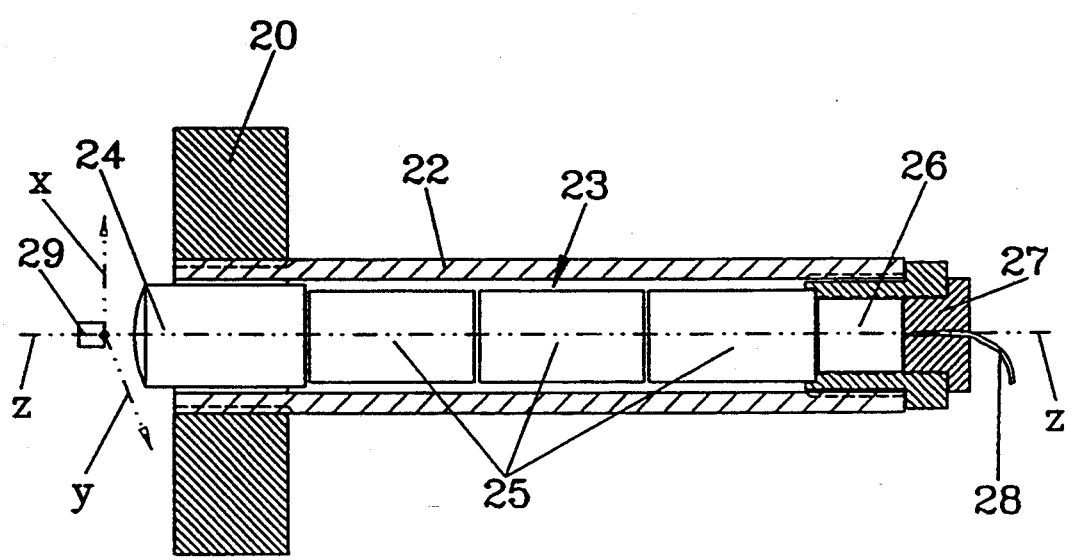
FIG. 5. shows on a larger scale the holder for components according to FIG. 2 together with components placed inside it, which components together with components in a fixed unit define an optical ray path.

One base element of the second elastic block 12 coincides with the movable base element 14 of the system 11 mentioned above, to which in addition to the elastic elements 17 there is another set of elastic elements 19 attached, e.g. 4, with a corresponding function as the elastic elements 17. The elastic elements 19 are at its opposite ends attached to a third movable base element 20, which likewise consists of a plate with a central aperture 21. Its size is chosen such that, with a certain play, it can be contained in the aperture 15 of the first fixed base element 13. There is an arm 22 screwed into inner threads of the aperture 21, which arm in the embodiment shown consists of a tube, that serves as a holder for a number of components 23—see FIG. 5—, which latter in a certain application can consist of e.g. a collimating lens, a number of optical isolators and filters 25, a focussing lens 26 and a ferrule 27, i.e. a ring fixture for a glass fibre guide 28. Further in FIG. 5 number 29 denotes a light source, e.g. a semiconductor laser, that belongs to the fixed reference unit, relatively to which the optical components 23 shall be positioned with the help of the adjustment mechanisms 30.

The two elastic blocks 11 and 12 constitute together a cantilevered system, which through the base element 13 has its root anchored to the housing. The elastic undeformed cantilevered system has its main axis perpendicular to the plate elements 13, 14 and 20. The positioning device of FIGS. 1 and 2 is shown on a larger scale than the natural. In reality its size is only one or a few centimeters. The parts of the elastic blocks are shaped in such a way that they allow for a compact integration into relevant portions of the optical and electrooptical equipment. The travel of the adjustment mechanism 30 shall be limited to the length actually needed and in adjusting, e.g. a fibre guide 28 relatively to a laser 29 in a communication system, perhaps only a travel of a few tenths of a millimeter is required.

It shall be possible to integrate multiple functions in the same positioning device, e.g. it shall be possible to have translations in several directions or combinations of translation and turning or solely a turning. To achieve these functions an adjustment mechanism 30 is used, that can affect the elastic blocks 11 and 12 in different ways, depending on how one chooses to let the adjustment screw 31 act in different points on the arm 22. In the normal case the points in which the forces are chosen to act are fixed points, that with respect to the application are situated at given distances from the root of the system. By lengthening the arm 22 in such a way that it extends beyond the common base element 14 and by letting the adjustment screw 31 act in a point at this extended end part, a turning of the the systems in the region of the third base element 20 is achieved. The strength of the force applied determines the size of the change in geometry of the cantilevered system. In the example of an embodiment shown in FIGS. 1 and 2 two mutually independent alterations can be performed, e.g. two orthogonal translations. It is for instance also possible to translate the component holder 22 in one direction and independently turn it about an axis, that has the same direction as the translation.

Since the movements of the two elastic blocks are very small, it is also important that the adjustment mechanism is adapted to these small movements. To this end the adjustment screw 31 is suitably made as a differential adjustment screw, which implies that it consists of a nut piece 32, that in its outer threads 33 is screwed into the housing 18 and which has inner threads, which act together with the outer threads 36 of a screw nut piece 35, which has inner threads 37 that in turn act together with the outer threads 38 of a screw tap 47, that has an end part 39 with a noncircular cross section, that corresponds to the aperture 40 of the nut piece 32, through which the end part 39 of the screw tap extends. The pitch of the threads 34 and 36, that may for instance be 0.25 mm/turn, deviates somewhat from the pitch of the threads 37 and 38, which may for instance have a pitch of 0.2 mm/turn, in order to get the translation of the tap scew 47 geared to 0.05 mm/turn.

Figure 4:
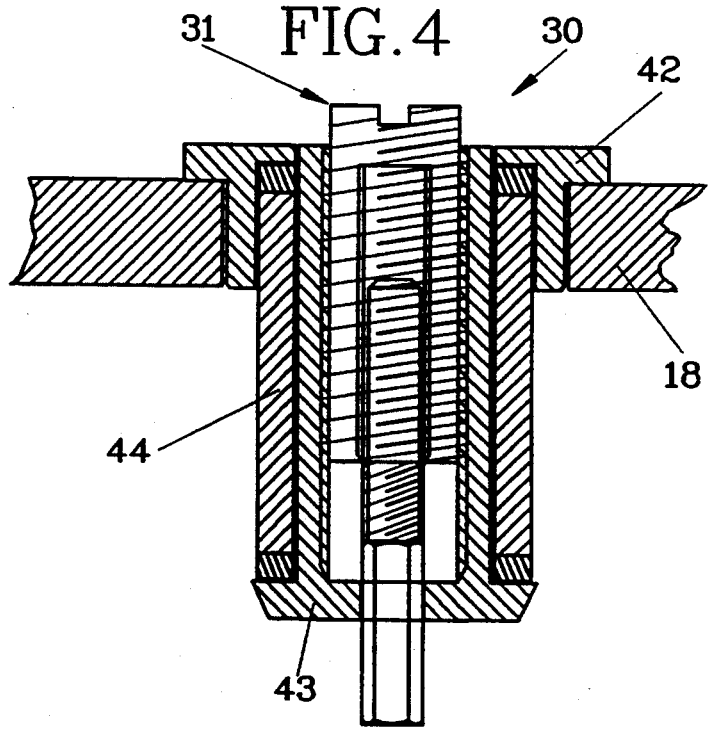
FIG. 4. shows a modified example of an embodiment of the adjustment device according to the invention, partly in sections, and comprising on the one hand a differential screw and on the other hand a piezoelectric adjustment arrangement.

In order to make the adjustment mechanism 30 still more sensitive the modified adjustment mechanism in FIG. 4 can be used, in which case the nut piece 32 of the differential set screw 31 has been split into two parts, a base fixture 42 and a nut piece 43, inbetween which a tube shaped piezo electric element 44 has been fixedly arranged, that, when an electric voltage is applied, gets the length altered and thereby transfers the nut piece 43 axially a distance, that is determined by the voltage applied.

The adjustment mechanism 30, that applies a force onto the arm 22, does not necessarily contain a screw device. The latter can be substituted by some other force delivering mechanical arrangement or e.g., solely by an electro- or magnetostrictive element.

Figure 6:
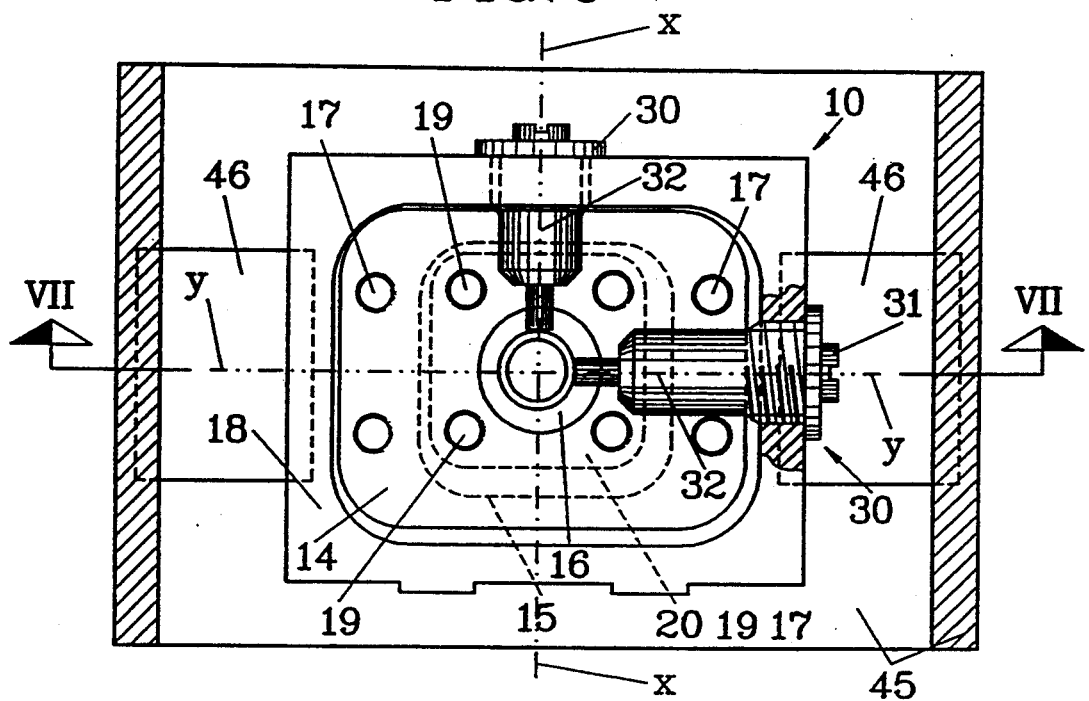
FIG. 6. shows an analogous view to that of FIG. 1 of an extended positioning device in which an inner unit, that consists of the positioning device of FIG. 1, can be translated and/or turned around an axis perpendicular to the translation.
Figure 7:
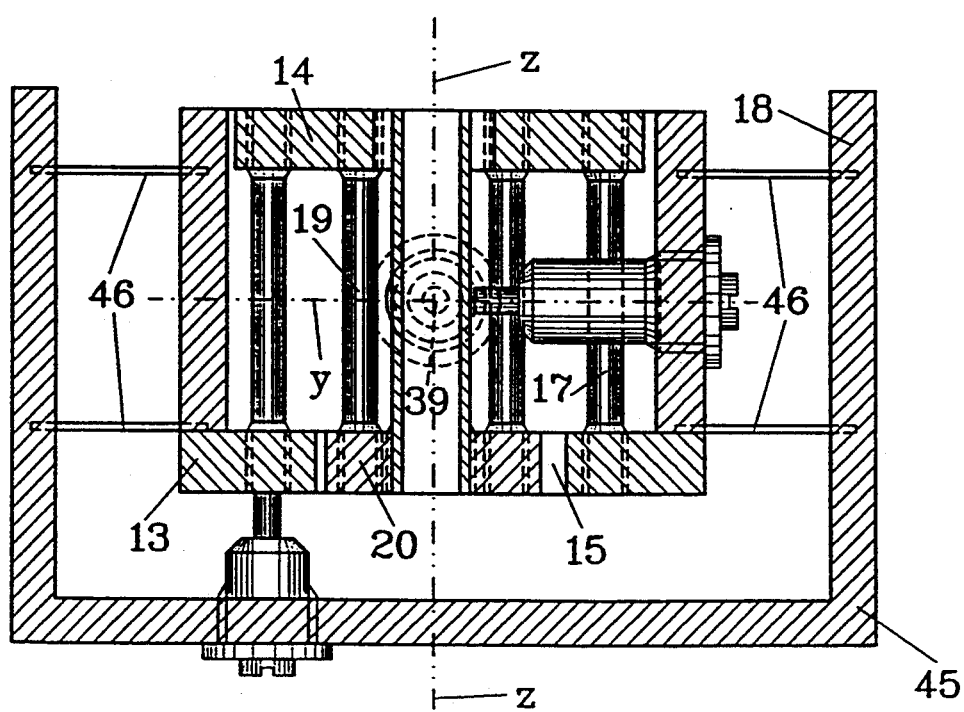
FIG. 7. shows a section along the line VII—VII of FIG. 6.

In certain cases it may be necessary to perform a positioning in three coordinates x, y, and z. The modification of the positioning device FIGS. 1 and 2 presented in FIGS. 6 and 7 is supplemented by a 4th base element 45 arranged outside the elastic elements 11 and 12 in the fixed reference unit, that may be the outer housing of the extended positioning device, from which a number of elastic elements 46, which at their opposite end are attached to the inner housing of the device. The elastic elements 46 can favourably be flat elastic elements, that only allow for movements in the direction of the main axis z of the device.

The invention shown and described is not limited to the embodiments demonstrated, but can be varied in numerous different ways within the frame of the patent claims. Positioning devices can be utilized in many connections where the emphasis is on precision of movements and alteration of attitudes, that have to be made by small rigidly mounted building elements, e.g. adjustments of lenses and other optical elements in aligning equipments, movements of objectives in microscopes, balancing of elements in mechanical apparatuses, trimming of the plate distance in electrical capacitors etc.

TABLE OF REFERENCE DESIGNATIONS

10 = positioning device
11 = 1st elastic block
12 = second elastic block
13 = 1st base element, e.g. a plate
14 = 2nd base element, e.g. a plate
15 = central aperture in 1st base element
16 = central aperture in 2nd base element
17 = elastic elements, e.g. rods
18 = housing
19 = elastic elements, e.g. rods
20 = 3rd base element, e.g. a plate
21 = central aperture in 3rd base element
22 = arm = tube = holder
23 = components used in optical and optoelectronic equipment
24 = collimating lens
25 = optical isolator and filter
26 = focussing lens
27 = ferrule (ring fixture)
28 = glass fibre guide
29 = light source, e.g. semiconductor laser, included in the fixed reference unit
30 = adjustment mechanism
31 = adjustment screw, e.g. differential adjustment screw
32 = nut piece
33 = outer threads of 32
34 = inner threads of 32
35 = screw nut piece
36 = outer threads of 35
37 = inner threads of 35
38 = outer threads of 47
39 = end part
40 = aperture
42 = base fixture
43 = nut piece
44 = piezoelectric element
45 = 4th base element, e.g. outer housing of the extended positioning device, included in the fixed reference unit
46 = elastic elements
47 = tap screw
z = main axis

I claim:

1. A device for lash free positioning of components used in optical and opto-electronical equipment relative to a fixed reference unit, the device comprising:
   a fixed first elastic block comprising a first base element and a second base element, the first base element being adapted to be secured to the fixed reference unit;
   a movable second elastic block comprising a third base element and the second base element, the second and third base elements being adapted to be movable relative to the first base element;
   the first and second base elements being interconnected by elastic elements and the second and third base elements being interconnected by elastic elements such that the second base element and elastic elements form a cantilevered system with respect to the fixed first base element, each elastic block being substantially rigid in a z-direction of the cantilevered system and elastic in a x-direction and a y-direction thereof, the x and y directions being perpendicular to the z-direction;
   a component holder to which the optical and opto-electronical equipment components are adapted to be fixed, the component holder being engaged by the third base element; and
   adjustment means operatively arranged between the fixed reference unit and the component holder for applying forces to the component holder to selectively move the holder in the x and y directions, the elastic elements of the cantilevered system being deformed when the adjustment means applies the forces to displace the component holder.

2. A device according to claim 1, wherein the fixed first base element and the movable third base element are located in a first plane and the second base element is located in a second plane displaced from the first plane.

3. A device according to claim 1, wherein the first base element defines a first aperture, the second base element defines a second aperture, and the third base element defines a third aperture to provide a central optical path through the cantilevered system in the z-direction.

4. A device according to claim 1, wherein the component holder is a cantilevered arm that can be displaced in the x and y directions by the adjustment means.

5. A device according to claim 1, wherein the adjustment means includes one or more set screws.

6. A device according to claim 1, wherein the adjustment means includes one or more electro or magnetostrictive elements.

7. A device according to claim 5, wherein the cantilevered system is supported within a first housing to which the first base element is rigidly attached, the second base element being a common element forming part of each elastic block, the third base element being disposed in a plane common to that of the first base element, the set screws being adjustably mounted in the first housing and operatively arranged relative to the component holder to apply forces thereto in mutually perpendicular x and y directions.

8. A device according to claim 5, wherein each set screw is a differential screw including first, second and third parts screwed into each other, the first part and second part being threadably connected by a first thread pitch, the second and third parts being threadably connected by a second thread pitch different from the first thread pitch, thereby defining a gear ratio between the first, second and third parts.

9. A device according to claim 7, wherein the first housing is placed in a second housing, the second housing being translatable and rotatable relative to the fixed reference unit.

10. A device according to claim 1 wherein the elastic elements include rod-shaped springs.

11. A device according to claim 1 wherein the elastic elements include plate-shaped springs.

12. A device according to claim 8 comprising a piezoelectric device operatively connected to the differential screw so as to enable adjustment of the position of said screw.

13. A device for lash free positioning of components used in optical and opto-electronical equipment, the device comprising:
   a rigid tubular frame having a longitudinal axis and having opposite upper and lower ends and a first aperture of a first predetermined size defined through the tubular frame;

a flat flange having an upper side and a lower side, the flange being secured to the lower end of the frame and extending inwardly into the central opening to define a second aperture having a second predetermined size that is smaller than the first predetermined size;

an upper plate having a top surface and a bottom surface, the upper plate being disposed within the central opening of the frame adjacent the upper end of the frame so that the upper plate is displaced from the flange, the upper plate defining a third aperture being substantially concentric with the second aperture of the flange and having a third predetermined size that is smaller than the second predetermined size of the second aperture;

a first rod having opposite ends, one end being operatively attached to the upper side of the flange and the other end being operatively attached to the bottom surface of the upper plate so that the rod extends within the central opening and is substantially parallel to the longitudinal axis of the frame, the first rod being substantially rigid in a longitudinal z-direction but flexible in a lateral x-direction and a lateral y-direction, the z-direction being parallel to the longitudinal axis of the first aperture and perpendicular to the x and y-directions, a lower plate having a top surface and a bottom surface, the lower plate being disposed within the second aperture defined by the flange and displaced from the upper plate, the lower plate defining a fourth aperture having a fourth predetermined size that is smaller than the third predetermined size of the third aperture and substantially concentric therewith;

a second rod having opposite ends, one end being operatively attached to the bottom surface of the upper plate adjacent the third aperture, the other end being operatively attached to the top surface of the lower plate so that the second rod is substantially parallel to the first rod; the second rod being substantially rigid in the longitudinal z-direction but flexible in the lateral x and y-directions so that the upper and lower plates are movable relative to the frame in the x and y-directions;

a tubular component holder to which the optical and opto-electronical equipment components are adapted to be held, the component holder having opposite ends and a substantially constant diameter, one end being disposed within the fourth aperture and fixedly attached to the lower plate and the other end being disposed within the third aperture so that the tubular component is substantially parallel to the first and second rods;

a first set screw adjustably mounted within a first threaded lateral hole defined by the frame, the first set screw being parallel to the x-direction and being adapted to be extended laterally and inwardly in the x-direction by rotating the first set screw within the first threaded hole to engage the component holder to move the component holder in the x-direction, the first and second rods being adapted to deform in the x-direction when the first set screw moves the component holder in the x-direction; and a second set screw adjustably mounted within a second threaded lateral hole defined by the frame, the second set screw being parallel to the y-direction and perpendicular to the first set screw, the second set screw being adapted to be extended laterally and inwardly in the y-direction by rotating the set screw within the second threaded hole to engage the component holder to move the component holder in the y-direction, the first and second rods being adapted to deform in the y-direction when the second set screw moves the component holder in the y-direction, whereby the position of the component holder relative to the frame may be adjusted in both the x and the y directions by the set screws.

* * * * *